United States Patent [19] [11] 3,860,753
Tsuneta et al. [45] Jan. 14, 1975

[54] IMAGE RECEIVING AND IMAGE TRANSMITTING FIBER OPTICS CATHODE RAY TUBE FOR FACSIMILE TRANSCEIVER

[75] Inventors: Asahide Tsuneta, Kawasaki; Norio Harao, Yokohama, both of Japan

[73] Assignee: Tokyo Shibaura Electric Co., Ltd., Kawasaki-shi, Japan

[22] Filed: Dec. 20, 1973

[21] Appl. No.: 426,563

Related U.S. Application Data

[63] Continuation of Ser. No. 147,807, May 28, 1971, abandoned.

[30] Foreign Application Priority Data

May 30, 1970 Japan ............................ 45-52671
May 30, 1970 Japan ............................ 45-52672

[52] U.S. Cl. ................ 178/7.85, 313/475, 313/478
[51] Int. Cl. ........................ H01j 25/85, H01j 31/12
[58] Field of Search ........ 313/92 LF, 89 LF, 65 LF; 178/7.85

[56] References Cited

UNITED STATES PATENTS

| | | | |
|---|---|---|---|
| 3,234,329 | 2/1966 | Eisner | 178/7.85 |
| 3,544,715 | 12/1970 | Herriott | 178/7.85 |
| 3,605,109 | 9/1971 | Tyler et al. | 346/34 X |
| 3,609,231 | 9/1971 | Nagao et al. | 313/89 LF |
| 3,619,691 | 11/1971 | Tomi et al. | 313/92 R |
| 3,662,204 | 5/1972 | Hamann | 313/92 LF |
| 3,688,144 | 8/1972 | Harao et al. | 313/92 LF |
| 3,700,955 | 10/1972 | Lowe | 315/20 |

*Primary Examiner*—Robert Segal
*Attorney, Agent, or Firm*—Flynn & Frishauf

[57] ABSTRACT

An electron-optical cathode ray tube has a face plate comprising a fiber plate to achieve image receiving and a clear glass plate to achieve image transmission, the glass plate being positioned at a retracted position relative to the fiber plate, whereby image transmission and receiving can be effected.

7 Claims, 7 Drawing Figures

IMAGE RECEIVING AND IMAGE TRANSMITTING FIBER OPTICS CATHODE RAY TUBE FOR FACSIMILE TRANSCEIVER

This is a continuation of application Ser. No. 147,807, filed May 28, 1971, now abandoned.

BACKGROUND OF THE INVENTION

This invention relates to cathode ray tubes and more particularly to a fiber optic cathode ray tube for image receiving and transmission in facsimile systems.

In facsimile transmission in which an image represented on printed matter, photographs, etc. is converted into an electrical signal, the electrical signal is transmitted to a remote place via a high speed circuit and the image is reproduced on a recording sheet at the receiver on the basis of the transmitted signal. Independent cathode ray tubes were generally necessary each for transmission and receiving. As the use of such independent devices made the installation bulky and its construction complicated, it was found necessary to develop a cathode ray tube achieving both image transmission and receiving. to develop. As a result, there has been proposed a cathode ray tube having a face plate in which a fiber plate for image receiving and a clear glass plate for image transmission are arranged to lie on the same plane. According to such a device, image receiving is effected by moving a photosensitive sheet in sliding contact with the face plate and sensitizing the sheet on the basis of a degree of light emission of a phosphor screen placed inside the fiber plate and impinged by an electron beam. Image transmission is achieved by moving along on the face plate material to be transmitted and reproduced, focusing the light emitted for a phosphor screen positioned inside the clear glass plate toward said material to be reproduced, and converting the light reflected from said material into electrical signals.

As the prior art cathode ray tube includes the fiber plate and the glass plate arranged on the same plane, these plates tend to be subject to scratches when a photosensitive paper travels in sliding contact with the plates at the time of image receiving. Scratches formed in the surface of the fiber plate appear to give substantially no harmful effect on an image to be reproduced. However, those formed in the glass plate will act to scatter a light to be emitted by the phosphor screen, with the result that the reflecting light from the material to be reproduced at the time of image transmission will have a poor contrast. When such a reflecting light is photoelectrically converted, the electrical signal or image transmission signal thus produced is inferior in S/N ratio, so that the distinction of an image reproduced on the basis of the electrical signal becomes poor.

SUMMARY OF THE INVENTION

The object of this invention, therefore, is to provide a fiber optics cathode ray tube having a face plate which comprises an image transmission glass plate and an image-receiving fiber plate, in which the glass plate is arranged to lie on the retracted plane from that on which the fiber plate lies, in order to prevent a photosensitive paper passing over the face plate in slidable contact therewith from damaging the surface of the glass plate. The surface of the glass plate may preferably deposited with a rigid transparent sheet or plate.

DETAILED DESCRIPTION OF THE INVENTION

Figures 1, 2, 3:
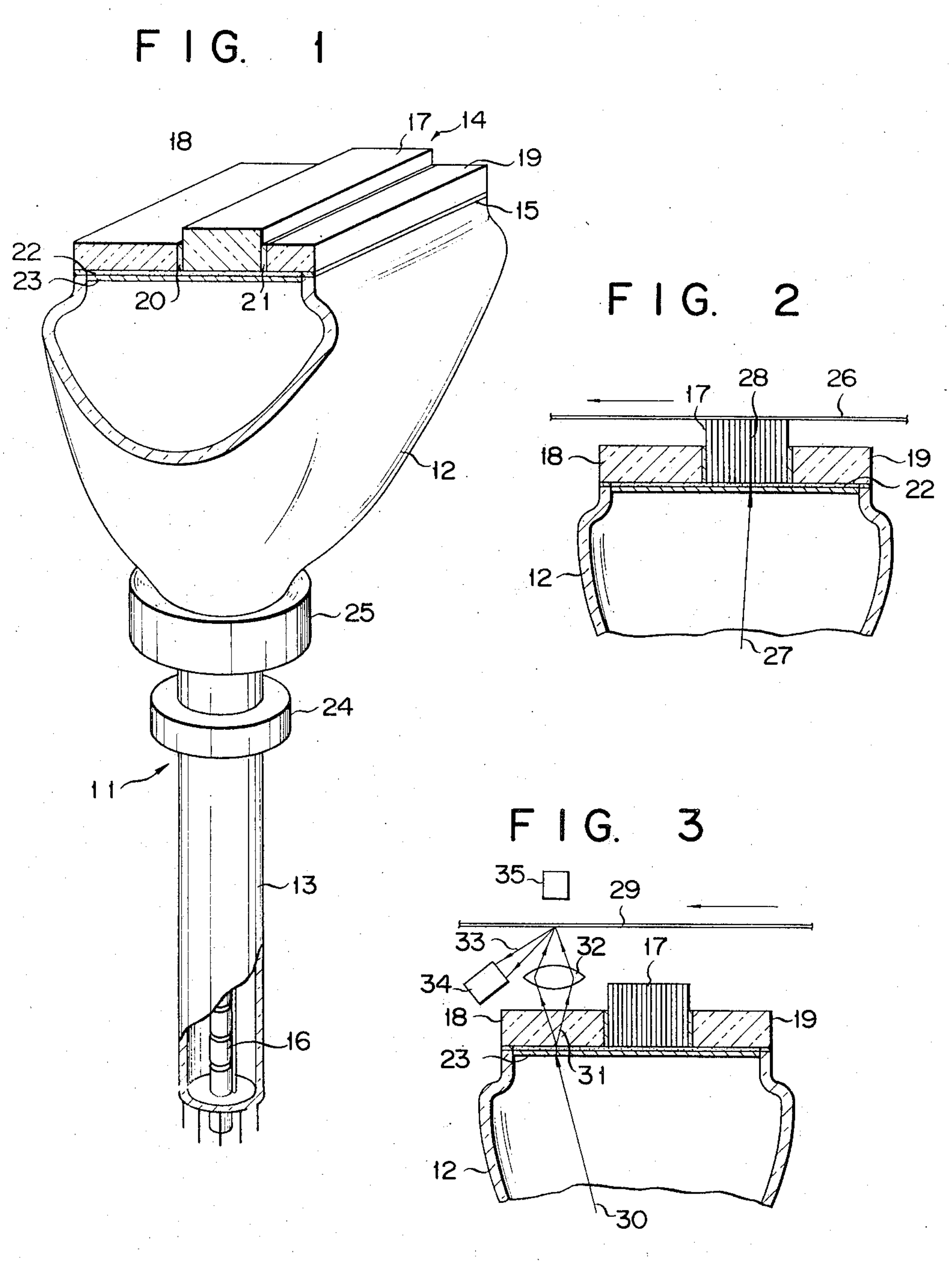
FIG. 1 is a perspective view of a fiber optics cathode ray tube embodying this invention.
FIG. 2 is a view showing the passage of light through a fiber plate of the device shown in FIG. 1.
FIG. 3 is a view showing the passage of light through a glass plate of the device shown in FIG. 1.

In FIG. 1 is shown a funnel tube 11 comprising an elliptical cone 12 and a neck 13 connected to a diameter-reduced end of the cone 12. To the opposite end of the cone portion 12 having a large diameter is connected a face plate by use of an adhesive agent 15 of frit glass. An electron gun 16 is housed in the neck portion 13 so as to be directed toward a face plate 14. The face plate 14 comprises a fiber plate 17 and glass plates 18 and 19 formed on both sides of the fiber plate 17 and connected thereto by means of adhesive agents 20 and 21 formed of frit glass, said fiber plate 17 being formed of a bundle of optical fibers in which a number of optical fibers are arranged in the axial direction of the tube and cemented together by means of suitable bonding material. The glass plates 18 and 19 are so thin that the outer surfaces thereof lie in a lower plane (as viewed in FIG. 1) than that of the outer surface of the fiber plate 17. That is, the outer surfaces of glass plates 18 and 19 are in a plane which is closer, in the axial direction of the tube, to the electron gun end of the tube than is the plane of the outer surface of the fiber plate 17. The glass plate 18 is used for image transmission while the glass plate 19 for supporting. On the inner surface of the face plate 14 is deposited a phosphor screen 22. The phosphor screen 22 is formed of fluorescent substances, such as, [$ZnS:Ag$] or [$Y_3Al_5O_{12}:Ce$] suitable for image receiving, at its part covering the inner surface of the fiber plate 17, and [$ZnS:Ag:Ni$] or [$Y_3Al_5O_{12}:Ce$] at its parts covering the inner surfaces of the glass plates 18 and 19 to be suited for image transmission. If desired, the phosphor screen may be formed of a single substance suitable both for image transmission and receiving, for example, "Aluminized PYP" (marketed by Tokyo Shibaura Electric Co., Ltd., Japan). To the inner surface of the phosphor screen 22 is provided a metal back 23.

On the outer circumference of the neck portion 13 are provided a focus coil 24 for focusing electron beams radiated from the electron gun 16 and a deflecting coil 25 for directing the focused beams toward a predetermined direction and deflecting them. The focus coil 24 and deflecting coil 25 are arranged along the direction of emission of electron beams in the order mentioned. Thus, the deflecting coil 25 directs the electron beam toward the fiber plate 17 or glass plate 18 and deflects the beam so that it scans one dimensionally the phosphor screen 22 located at the inner surface of the plate 17 or 18 to which the beam has been directed.

The operation of the tube of this invention will now be discussed.

The invention will be described first in connection with the cathode ray tube as being used for image receiving. As shown in FIG. 2, a photosensitive sheet 26 is moved in the longitudinal direction of the face plate 14, viz, a direction perpendicular to the direction of scanning of the electron beam 27, in contact with the fiber plate 17. The electron beam 27 emitted from the electron gun 16 and having a current density proportional to the image transmission signal is focused by the focus coil 24 and directed, by the deflecting coil 24, toward the direction of the fiber plate 17 and deflected to one-dimensionally scan the phosphor screen at the inner surface of the fiber plate 17. A luminous flux 28 from the phosphor screen 22 which is generated by the scanning by the electron beam in proportion to the current density of the electron beam passes through the fiber plate 17 and sensitizes the photosensitive sheet 26 to reproduce an image thereon.

In the case of image transmission, matter to be reproduced (or an original sheet) 29 is moved in a direction perpendicular to the direction of scanning of the electron beam 30 without being in contact with the face plate 14. The electron beam 30 from the electron gun 16 which has a certain current density is focused by the focus coil 24 and caused to scan one-dimensionally the phosphor screen 22 at the inner surface of the glass plate 18 after being directed toward the image receiving glass plate 18. Scanning by the electron beam 30 causes the screen 22 to produce a light and a luminous flux 31 from the screen 22 is passed through the clear glass plate 18 and focused onto the matter to be reproduced 29 by means of an optical lens 32 disposed sidewardly of the glass plate 18. The light thus focused is reflected depending on the light and dark or shaded portions of the matter to be reproduced 29, and the reflected light 33 is converted into an electrical signal by a photoelectric converter 34 located on the side of the optical lens 32. If the matter to be reproduced 29 is represented on a transparent body, the focused light passes through the body depending upon the light and dark or shaded portions of the matter to be reproduced and converted into an electrical signal by the photoelectric converter 35 placed at the back of the matter to be reproduced. As the glass plate 18 lies on a retracted plane from that on which the fiber plate 17 lies, the outer surface of the glass plate 18 is prevented from being damaged or scratched by the photosensitive paper 26 at the time of image receiving, and thus can be maintained in a clean state to treat a distinct image at the time of image transmission.

Figure 4:
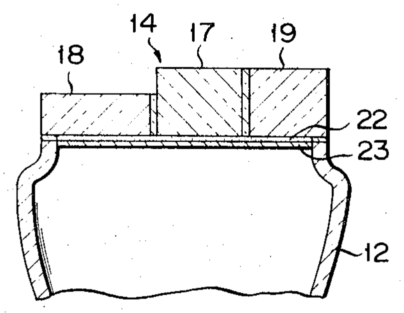
FIG. 4 is a cross section illustrating a modification of the face plate of the device shown in FIG. 1.
Figure 5:
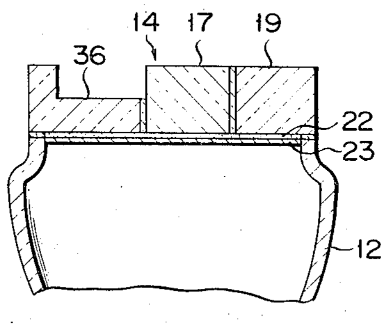
FIG. 5 is a similar view illustrating a further modification of the face plate.

As shown in FIG. 4, the face plate 14 may be constructed such that the supporting glass plate 19 lies on the same plane as the fiber plate 17 permitting only the image-transmission glass plate 18 to lie on the retracted plane. As shown in FIG. 5 and designated by 36, the glass plate 18 may further be such that its end remote from the fiber plate 17 has an upwardly extending integral projection whose outer surface is in the same plane that the surface of the fiber plate 17.

Figure 6:
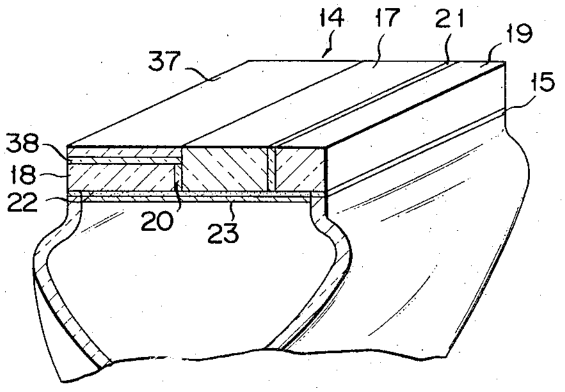
FIG. 6 is a perspective view of a modified face plate to be employed in a modification of the cathode ray tube.

Referring now to FIG. 6 which illustrates a modification of the cathode ray tube and in which like parts are designated by the same reference numerals and description thereof is omitted for the sake of brevity, each of the glass plates 18 and 19 is formed of soft glass material having the composition indicated in Table 1 and similar to the one forming the cone 12 and which has a thermal expansion coefficient of $85 \times 10^{-7}$cm/cm/°C. The glass plate 18 is made thinner than the glass plate 19 and bonded to one side of the fiber plate 14 by a bonding agent 20 of frit glass in such a manner that its outer surface is located lower than that of the fiber plate 14.

Table 1

| Composition | $SiO_2$ | $Al_2O_3$ | $Na_2O$ | $K_2O$ | $Sb_2O_3$ | $As_2O_5$ | BaO | $Li_2O$ |
|---|---|---|---|---|---|---|---|---|
| Content % | 66.8 | 4.34 | 7.2 | 7 | 0.6 | 0.2 | 12 | 0.5 |

The glass plate 19 having the same thickness as the fiber plate 17 is connected to the opposite side of the fiber plate by a similar bonding agent 21 so that the both outer surfaces may lie on the same plane. To the outer surface of the lowplane glass plate 18 is connected, by an adhesive agent 38 of polyester resin, a rigid transparent sheet 37 so that the surface of the transparent sheet 37 lies on the same plane as the fiber plate. The transparent sheet 37 may, for example, be formed of a substance containing the composition indicated in Table 2.

Table 2

| Composition | $SiO_2$ | $Al_2O_3$ | $Na_2$, $K_2O$ | $B_2O_3$ |
|---|---|---|---|---|
| Content % | 80 | 2.2 | 4.2 | 12.8 |

The inner surface of the face plate 14 of the construction described above is provided with a phosphor screen 22 whose inner surface in turn is supported by a metal back 23.

Figure 7:
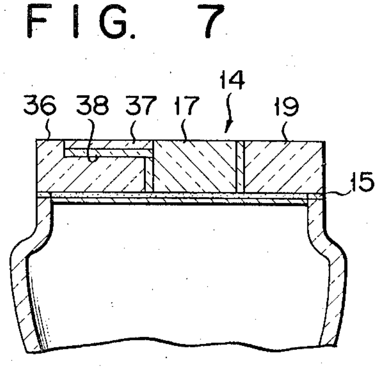
FIG. 7 is a cross section of a further modification of the face plate.

The face plate 14 as described above may be of the construction as shown in FIG. 7 in which the glass plate 23 used for image transmission has a projection at its side remote from the fiber plate 17, said projection having an outer surface lying in the same plane as the outer surface of the fiber plate and defining a recess into which a rigid transparent sheet 37 is securely mounted by means of an adhesive agent 38 in such a manner that its outer surface is in the same plane as that of the fiber plate. Such a construction will reduce the amount of expensive rigid transparent material to be employed.

The rigid transparent material or sheet used for the image transmission glass plate will be less subject to scratches than the glass plate when the sensitive sheet 26 runs in contact with the face plate 14, thus assuring positive and clear image reproduction. When the rigid transparent sheet 37 is ever damaged, it may be peeled off and replaced by a new one.

According to the cathode ray tube of this invention, the image transmission glass plate can be maintained free from damage or scratches which may otherwise be caused by a photosensitive paper, thereby always permitting clear image transmission to be effected.

What we claim is:

1. An image receiving and image transmitting fiber optics cathode ray tube for a facsimile transreceiver comprising:

a funnel-shaped tube including a cone portion and neck portion extending therefrom;

a face plate sealed at an end of said cone portion of said tube, said face plate having a layer of fluorescent material on the inner surface thereof;

image receiving means including a slender elongated image receiving glass fiber plate which forms a portion of said face plate and which is adapted to be scanned in only one direction and to be contacted with a photosensitive sheet passing thereover, said glass fiber plate being comprised of a number of glass fibers densely arranged in the axial direction of the cathode ray tube;

image transmission means including a slender elongated image transmission clear glass plate which forms a portion of said face plate and which is adapted to be scanned in only one direction, and an optical system facing said clear glass plate for focussing on an original sheet a light spot from said fluorescent layer which is on the inner surface of said clear glass plate, said glass fiber plate and said clear glass plate being juxtaposed with an outer surface of said glass fiber plate lying in a plane more remote from said end of said cone portion than an outer surface of said clear glass plate so that when said photosensitive sheet is passed over said face plate, said clear glass plate is protected from direct contact therewith;

a supporting glass plate forming a portion of said face plate and being juxtaposed to said glass fiber plate, said glass fiber plate being interposed between said clear glass plate and said supporting glass plate;

said fluorescent layer being at least coextensive with said image receiving glass fiber plate and said image transmission clear glass plate; and said image receiving means and image transmission means further including an electron gun unit disposed within said neck portion, opposed to said fluorescent layer, and emitting an electron beam to selectively scan the glass fiber plate during image receiving and the clear glass plate during image transmission.

2. The cathode ray tube according to claim 1 wherein said supporting glass plate has an outer surface lying in the same plane as that of said outer surface of said glass fiber plate.

3. The cathode ray tube according to claim 1 wherein said face plate further comprises a rigid transparent sheet adhered on the outer surface of said clear glass plate with the outer surface of said rigid transparent sheet lying in the same plane as that of said outer surface of said glass fiber plate.

4. The cathode ray tube according to claim 1 wherein said clear glass plate has a projection whose outer surface lies in the same plane as that of said outer surface of said glass fiber plate and forming a recess between said projection and said glass fiber plate.

5. The cathode ray tube according to claim 4 wherein said face plate further comprises a rigid transparent sheet mounted in said recess with an outer surface of said rigid sheet lying in the same plane as that of said outer surface of said glass fiber plate.

6. The cathode ray tube according to claim 1 further comprising deflecting means mounted around the neck portion for directing the focussed electron beam selectively to the optical fiber glass plate and the clear glass plate and one-dimensionally deflecting the electron beam.

7. The cathode ray tube according to claim 1 wherein the outer surface of said glass fiber plate lies in a plane more remote from said end of said cone portion than the outer surface of said supporting glass plate.

* * * * *